(12) United States Patent
Beene, Jr.

(10) Patent No.: US 10,308,904 B2
(45) Date of Patent: Jun. 4, 2019

(54) FOOD AND BEVERAGE FERMENTATION DEVICE

(71) Applicant: James Loy Beene, Jr., Memphis, TN (US)

(72) Inventor: James Loy Beene, Jr., Memphis, TN (US)

(73) Assignee: James Loy Beene Jr., Memphis, TN (US)

( * ) Notice: Subject to any disclaimer, the term of this patent is extended or adjusted under 35 U.S.C. 154(b) by 270 days.

(21) Appl. No.: 15/366,489

(22) Filed: Dec. 1, 2016

(65) Prior Publication Data

US 2017/0267956 A1    Sep. 21, 2017

Related U.S. Application Data

(60) Provisional application No. 62/310,083, filed on Mar. 18, 2016.

(51) Int. Cl.
| | |
|---|---|
| *A23B 7/10* | (2006.01) |
| *C12G 3/02* | (2019.01) |
| *A23L 3/00* | (2006.01) |
| *A23B 7/12* | (2006.01) |

(Continued)

(52) U.S. Cl.
CPC ............... *C12G 3/02* (2013.01); *A23B 7/12* (2013.01); *A23L 3/00* (2013.01); *B65D 51/1644* (2013.01); *A23B 7/10* (2013.01); *A23V 2002/00* (2013.01); *B65D 51/26* (2013.01)

(58) Field of Classification Search
CPC .. A23B 7/10; A23B 7/105; A23B 7/12; B65D 51/1644; B65D 51/26; B65D 53/02; B65D 79/005; B65D 41/02; B65D 71/05

USPC ...... 99/277.1, 277, 276, 476, 472, 495, 349, 99/322; 220/371, 369, 568, 578, 580, 220/713, 716, 718

See application file for complete search history.

(56) References Cited

U.S. PATENT DOCUMENTS

| | | | | |
|---|---|---|---|---|
| 1,815,569 A | * | 7/1931 | Johnson ................. | A47J 36/06 220/580 |
| 3,209,674 A | * | 10/1965 | Payne ..................... | A23B 7/10 138/42 |

(Continued)

FOREIGN PATENT DOCUMENTS

| | | |
|---|---|---|
| CN | 104609022 A | 5/2015 |
| KR | 20-19810001826 Y1 | 10/1981 |

(Continued)

OTHER PUBLICATIONS

International Search Report in related international application PCT/US2017/019875 dated Jun. 8, 2017 (3 pages).

(Continued)

*Primary Examiner* — Reginald Alexander
(74) *Attorney, Agent, or Firm* — Kelly G. Swartz; Widerman Malek, PL

(57) ABSTRACT

A food and beverage fermentation device including a hollow tapered body, a lip, a base, and at least one aperture. The hollow tapered body may have a wide end and an opposing narrow end adapted to be received by a container. The lip may be located along the wide end and adapted to rest upon a rim of the container. The base may extend across an inner region defined by a wall of the hollow tapered body. At least one aperture extending through the wall.

16 Claims, 3 Drawing Sheets

(51) Int. Cl.
*B65D 51/16* (2006.01)
*B65D 51/26* (2006.01)

(56) References Cited

U.S. PATENT DOCUMENTS

| | | | | |
|---|---|---|---|---|
| 4,723,674 A | * | 2/1988 | Nunes | B65D 39/02 |
| | | | | 215/231 |
| 5,370,260 A | * | 12/1994 | Paramski | A47G 19/183 |
| | | | | 220/580 |
| 2007/0228051 A1 | * | 10/2007 | Meroni | B65D 43/0218 |
| | | | | 220/580 |
| 2009/0196953 A1 | * | 8/2009 | Sin | A23B 7/10 |
| | | | | 426/49 |
| 2010/0089252 A1 | * | 4/2010 | Hong | A47J 43/28 |
| | | | | 99/495 |
| 2014/0116271 A1 | | 5/2014 | Diggs et al. | |
| 2015/0272147 A1 | | 10/2015 | Ericson et al. | |

FOREIGN PATENT DOCUMENTS

| | | |
|---|---|---|
| KR | 10-1314904 B1 | 10/2013 |
| WO | 2014-194347 A1 | 12/2014 |

OTHER PUBLICATIONS

International Written Opinion in related international application PCT/US2017/019875 dated Jun. 8, 2017 (9 pages).

* cited by examiner

FOOD AND BEVERAGE FERMENTATION DEVICE

RELATED APPLICATIONS

This application claims the benefit under 35 U.S.C. § 119(e) of U.S. Provisional Patent Application Ser. No. 62/310,083 titled, Drink and Food Fermentation Retainer Aerating Insertion Device, filed Mar. 18, 2016, which is incorporated herein by reference in its entirety.

FIELD OF THE INVENTION

The present invention relates to systems and methods for food and drink fermentation.

BACKGROUND

Currently there are only a few solutions for keeping a food fermentation container food or beverage contents away from an airlock device used as a component during a food or beverage fermentation process. Some of these solutions attempt to weigh down the food fermentation container food or beverage contents, but these solutions can fail to meet the needs of the industry because they are simply incapable of actually keeping the food or beverage contents still and compact. These particular solutions may eventually shift while the food or beverage contents are expanding during the fermentation process at which time the food or beverage contents may rise up into the protruding exposed airlock device tube underneath the roof of the lid within a food fermentation container and cause growth of mold and undesirable bacteria because the escaped food or beverage content particles will constantly be exposed to the oxygen released by the cultured probiotics during the food or beverage fermentation process and moving through or trapped in the airlock device.

Other solutions seek to isolate a protruding exposed airlock device tube underneath the roof of the lid within a food fermentation container from the food fermentation container food or beverage contents, but these solutions are similarly unable to meet industry needs because they don't create an absolute air space completely separating and protecting the airlock device from exposure to the food fermentation container food or beverage contents. Still other solutions attempt to weigh down the food or beverage contents to keep them away from the airlock device, but these solutions are unsatisfactory in meeting the needs of the industry because they are usually made from glass and are therefore breakable, and the possibility of chipped or broken glass in the food or beverage product is certainly an unhealthy risk.

It would be desirable to have a device that is specifically designed and manufactured that keeps the food fermentation container food or beverage contents separate and completely incapable of touching the protruding exposed airlock device tube underneath the roof of the lid within the food fermentation container during the fermentation process of the food or beverage contents enclosed within a food fermentation container. Furthermore, it would also be desirable for the same device to be available in a disc, tray, plate, bowl, or cup shape that is designed and manufactured to situate onto the rim of the opening or mouth of a food fermentation container. Still further, it would be desirable for the same device to maintain consistent release of oxygen by the fermented probiotics rendered by the fermenting food or beverage contents during the fermentation process. Therefore, there currently exists a need in the industry for a device and associated method that keeps a protruding exposed airlock device tube underneath the roof of the lid within a food fermentation container clean as it keeps the airlock completely separated from the fermenting food or beverage contents of the food fermentation container while allowing the cultured probiotics to exhale oxygen from the airtight food fermentation container.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a Food and beverage fermentation device, which may include a hollow tapered body, a lip, a base, and at least one aperture. The hollow tapered body may have a wide end and an opposing narrow end adapted to be received by a container. The lip may be located along the wide end and adapted to rest upon a rim of the container. The base may extend across an inner region defined by a wall of the hollow tapered body. At least one aperture may extend through the wall.

The device may include a retaining mechanism located along the narrow end and adapted to limit movement of contents carried by the container. The retaining mechanism may include a plurality of teeth.

The hollow tapered body may be conical and the base may connect to the wall along an entirety of a wall circumference defining the narrow end.

The lip may have an outer diameter greater than an outer diameter of the wide end. The lip may be adapted to be secured between the rim and a lid secured to the container.

The lid may include a grommet adapted to carry an airlock tube.

The airlock tube may extend above the lid and may be adapted to release oxygen released during a fermentation process within the container.

The at least one aperture may include a first ovular slit located proximate the wide end and a second ovular slit opposing the first ovular slit.

The device may have a height less than 15% of a height of the container.

DETAILED DESCRIPTION OF THE INVENTION

Figure 1:
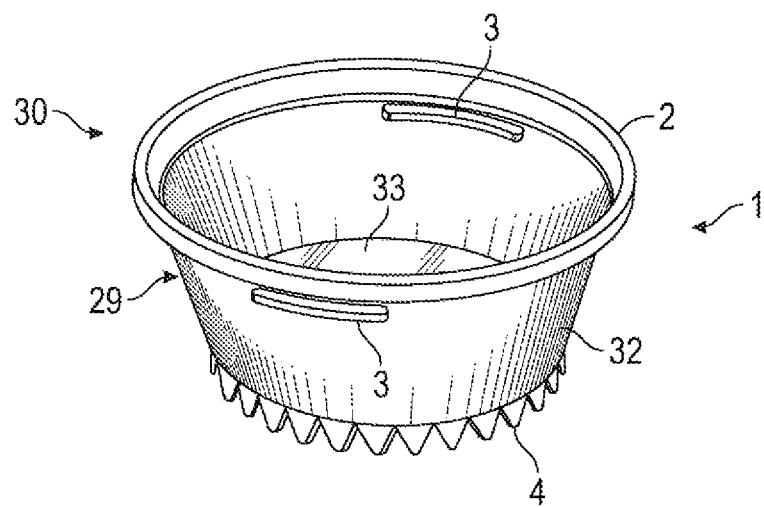
FIG. 1 is a top perspective view of a food and beverage fermentation device according to an embodiment of the present invention.
Figure 2:
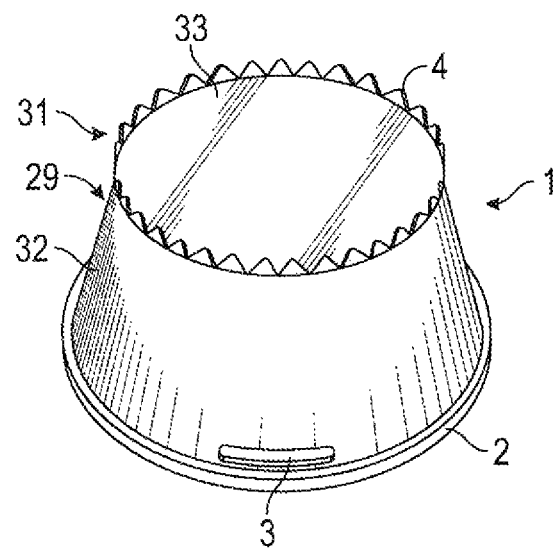
FIG. 2 is a bottom perspective view of the food and beverage fermentation device of FIG. 1.
Figure 3:
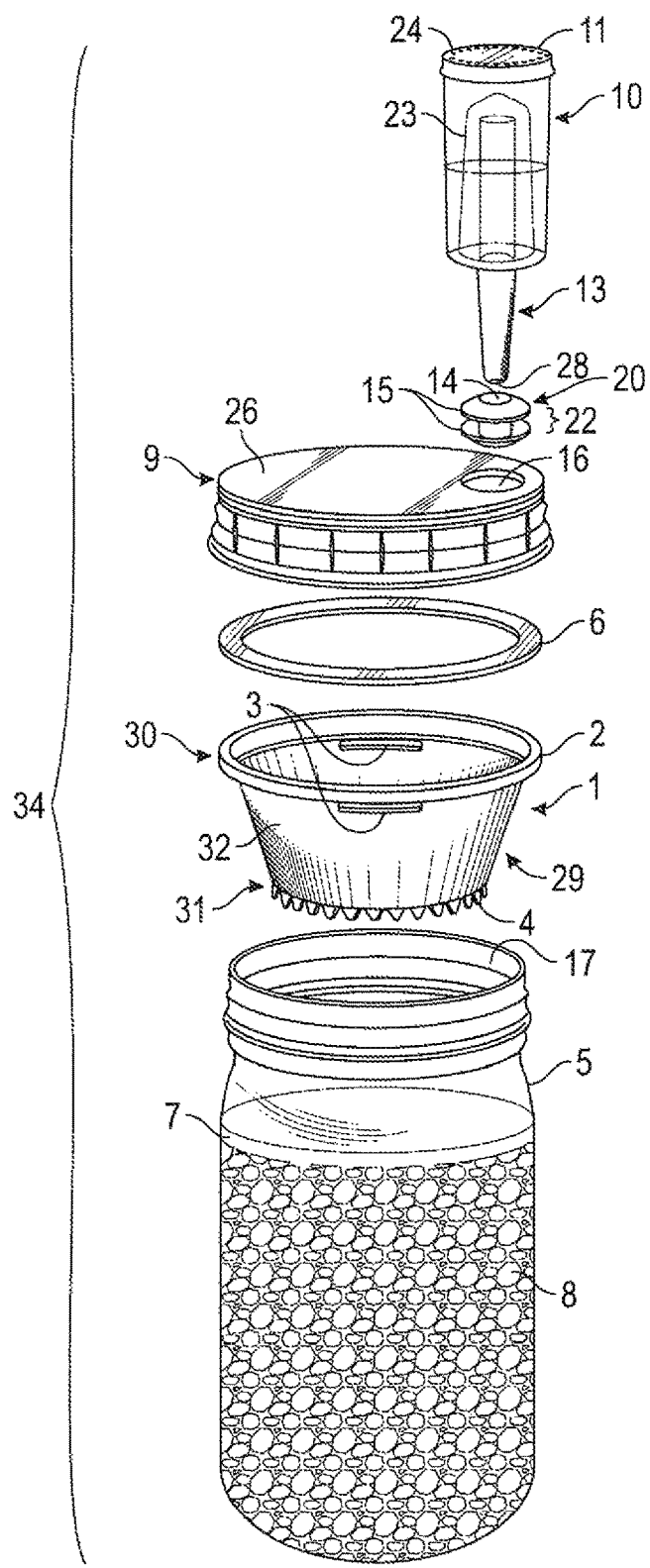
FIG. 3 is an exploded perspective view of a food fermentation assembly, including the food and beverage fermentation device, according to an embodiment of the present invention.
Figure 4:
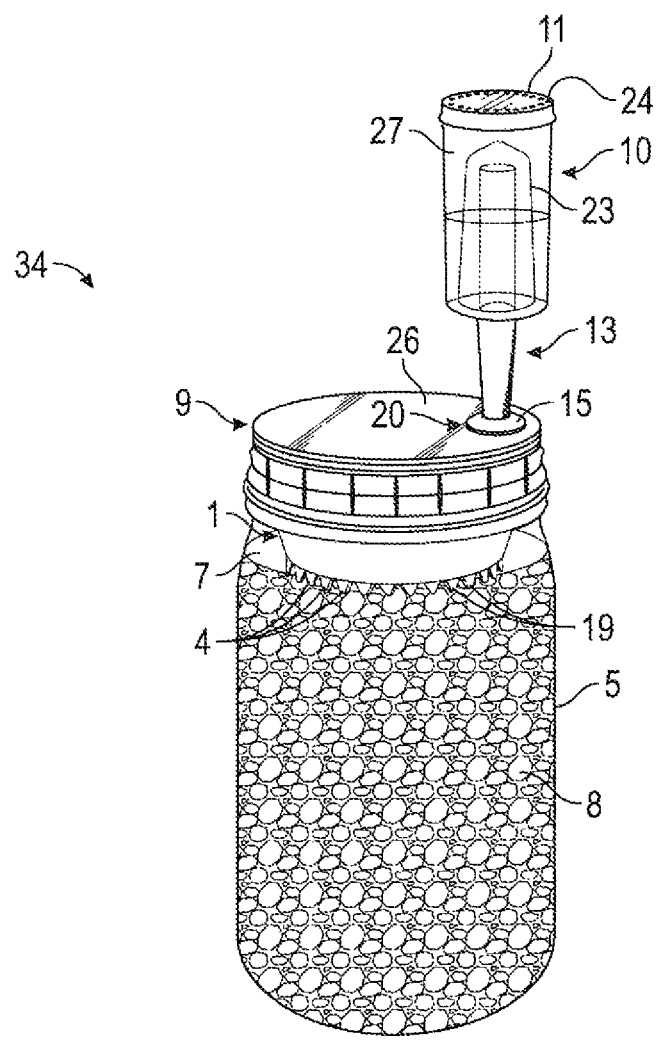
FIG. 4 is a perspective front view of the food fermentation assembly of FIG. 3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a food and beverage fermentation device 1, which may have a height and width sized to custom fit the height and width of the food fermentation container 5. The food and beverage fermentation device 1 may be adapted to retain food or drink within a container. The food and beverage fermentation device 1 may be designed to fulfill the purpose of providing an absolute air space to isolate an exposed protruding airlock device tube 13 underneath the roof of the lid 9 within the food fermentation container 5 keeping the airlock tube 13 completely separated from the food fermentation container 5 food or beverage contents 8 during the fermentation process.

Similarly, the associated method is unique in that it may 1) permit the airlock device 10 to consistently release oxygen released by the cultured probiotics during the food or beverage fermentation process without any possible obstruction of the airlock device 10 by the food or beverage contents 8 in the food fermentation container 5; and 2) promote the consistent effective fermentation of the food or beverage contents 8 within an airtight food fermentation container 5 by preventing any interference or hindrance which could otherwise have been caused by the food or beverage contents 8 expanding and rising during the fermentation process.

The food and beverage fermentation device 1 may include a disc, tray, plate, bowl, or cup shaped device, which may be referred to as a hollow, tapered body 29. The hollow, tapered body may be conical and have a wide end 30 and an opposing narrow end 31. A wall 32 may extend between the entirety of the wide end 30 and the narrow end 31. The narrow end 31 may be adapted to be inserted into and received by a food fermentation container 5. The wide end 30 may be adapted to be located at or near an opening of the food fermentation container 5. A lip 2 may be secured along an outer perimeter of the wide end 30 and adapted to rest upon the rim 17 of the opening of the container 5.

The hollow, tapered body 29 may have at least one aperture 3 extending through on entirety of the wall 32. The at least one aperture 3 may be a hole or slit in the wall 32 and may promote an effective, contamination-free fermentation of probiotic culture of food or beverage contents 8 as they allow the passage and release of oxygen released by the cultured probiotics during the food or beverage fermentation process from within the airtight food fermentation container 5 while the food and beverage fermentation device 1 protects the portion of the airlock device 10 extending underneath the roof of the lid 9 within a food fermentation container 5 from interference with or hindrance from expanding and rising food and beverage products during the fermentation process. The at least one aperture 3 may include an ovular slit located through an entirety of the wall 32. The ovular slit may be located proximate the wide end 30 to position the ovular slit above the level of the contents 8 within the food fermentation container 5. The at least one aperture 3 may include first and second ovular slits positioned on opposing sides of the wall 32.

A base 33 may extend across an inner region of the hollow, tapered body 29. The base 33 may be secured to the hollow, tapered body 29 along an entirety of a perimeter of the base 33. The perimeter of the base 33 may be secured directly to the wall 32 defining the inner region along an entirety of the wall 32 circumference defining the narrow end 31.

There may be any variation of the depth and diameter of the food and beverage fermentation device 1, and associated hollow, tapered body 29, to correlate with varying size food fermentation containers 5. There may be any variation of the base 33 or retaining mechanism 4 of the food and beverage fermentation device 1 to help keep food from shifting and rising, any variation of the at least one aperture 3 punched, molded, or otherwise formed in the wall 32 of the hollow, tapered body 29 to best facilitate the passage and release of oxygen released by the cultured probiotics during the food or beverage fermentation process from the food fermentation container 5 and to keep the airlock device 10 from being exposed to the food fermentation container food or beverage contents 8, and any variation of the top or bottom of the insertion device to assist in situating the device to stay positioned at the opening or mouth of the food fermentation container.

The food and beverage fermentation device 1 may be designed to fit inside and situate upon the rim 17 of the opening or mouth of a corresponding size food fermentation container 5 and the food and beverage fermentation device 1 may have at least one aperture 3 punched, molded, or otherwise formed into the wall of the food and beverage fermentation device 1 high enough near the top of the food and beverage fermentation device 1 to decrease the chances of the food fermentation container 5 food or beverage contents 8 entering into the food and beverage fermentation device 1, even when the food or beverage contents 8 expand causing the food fermentation container 5 food or beverage contents 8 to rise inside of the food fermentation container 5.

It should be further noted that the food and beverage fermentation device 1 may be designed to be used in conjunction with a food fermentation container 5, lid 9, seal 6, which may correspond to the size of the food fermentation container 5 opening or mouth, grommet 20 installed in the lid 9 for securing an airlock device 10, and an airlock device 10.

With respect to the associated method, in order to carry out the method, the following steps may be followed: (1) A food fermentation container 5 may be filled with the desired food or beverage contents 8 to a level where the food or beverage contents 8 do not touch the food and beverage fermentation device 1 after the food and beverage fermentation device 1 is placed in accordance with the present method. (2) The food and beverage fermentation device 1 may be placed just inside the opening or mouth of the food fermentation container 5 and carried upon the rim 17 of the food fermentation container 5 where it will situate and remain at the opening or mouth of the food fermentation container 5 while the food fermentation container 5 is being closed and through the duration of the food or beverage fermentation process. (3) The food fermentation container 5 may be made into an airtight enclosure by covering the opening or mouth with a lid 9 and gasket or seal 6, if needed. (4) An airlock device 10 may be inserted into a grommet 20 installed in the lid 9. By following this method, the food and beverage fermentation device 1 will prevent the overflow of food fermentation container 5 food or beverage contents 8 into the airlock device 10 as the food or beverage contents 8 expand during the fermentation process. The food and beverage fermentation device 1 will allow the airlock device 10 to continue the consistent passage and release of the oxygen released by the cultured probiotics while leaving no possibility for stoppage of the airlock device 10 or contamination of the food fermentation container food or beverage contents 8, which could result from the presence of unanticipated trapped oxygen released by the cultured probiotics during the food or beverage fermentation process and cause growth of mold and undesirable bacteria.

The food and beverage fermentation device 1 may have a height and diameter adapted to fit within a food fermentation container 5. The food fermentation container 5 may be a Mason jar or similar container. The food fermentation container 5 may have a rim 17 at its mouth or opening. The food fermentation container 5 may be a Mason jar of a standard size having either a regular or wide mouth. There may be any variation in size to the food and beverage fermentation device 1 to fit any varying size food fermentation jar or crock container 5, or to fit any variation size pail food fermentation container 5 to include sizes up to 5 gallons or more, such as 50 gallon drum food fermentation containers 5 or even greater size food fermentation containers 5.

The retaining mechanism 4 may include a plurality of teeth or legs positioned around a bottom edge of the narrow end 31 of the food and beverage fermentation device 1 to help keep the food and beverage contents 8 from shifting or rising. The retaining mechanism 4 may be adapted to limit movement of the contents 8 carried by the food fermentation container 5. The retaining mechanism 4 may be secured to a bottom portion of the hollow, tapered body 29 beneath the base 33. There may any variation to the retaining mechanism 4 to prevent or limit movement of the contents 8.

There may any variation of at least one aperture 3 punched, molded, or otherwise formed in the upper sides of the wall 32 to facilitate consistent passage and release of the oxygen released by the cultured probiotics during the food or beverage fermentation process through the airlock device 10.

A lip 2 may be secured to the wide end 30 of the hollow, tapered body 29. The lip 2 may extend outwardly from an outer diameter of the hollow, tapered body 29. The lip 2 may have an outer perimeter greater than the outer perimeter of the wide end 30. In embodiments in which the hollow, tapered body 29 is circular, the lip 2 may have an outer diameter greater than the outer diameter of the wide end 30. The lip 2 may be adapted to be secured between the rim 17 of a food fermentation container 5 and a lid 9 secured to the food fermentation container 5. The lip 2 may not extend beyond the outer perimeter of the rim 17 of the food fermentation container 5. The outer diameter of the lip 2 may be smaller than or equal to the outer diameter of the rim 17 of the food fermentation container 5. There may be any variation to the lip 2, which may be carried by the top rim 17 food fermentation container 5 and located along the top portion of the food and beverage fermentation device 1. The lip 2 may assist in keeping the food and beverage fermentation device 1 situated upon the rim 17 of the opening or mouth of the food fermentation container 5.

The food and beverage fermentation device 1 may be used to retain food or beverage contents 8 underneath the food and beverage fermentation device 1 and to provide a separate absolute air space within the food fermentation container 5 to keep the food or beverage contents 8 separate and completely isolated away from the fermentation airlock device 10. The separate absolute air space created by the food and beverage fermentation device 1 also separates, encases, and thus completely isolates the airlock tube 13, which is exposed as it protrudes through the grommet opening 14 located in the grommet 20 carried by the lid 9. The top portion of airlock tube 13 may extend above the lid 9 and be adapted to release oxygen released during the fermentation process occurring within the food fermentation container 5. A bottom portion of the airlock tube 13 may be positioned beneath the bottom side of the lid 9 during the food or beverage fermentation process. Such a position may permit the airlock device 10 to release oxygen released by the cultured probiotics during the food or beverage fermentation process. The released oxygen may travel to the airlock device 10 through at least one aperture 3 located in the wall 32.

The food and beverage fermentation device 1 may have a height. The height may be the distance between the bottom surface of the base 33 and the top of the wide end 30. The food and beverage fermentation device 1 may be sized to have a height equal to or less than 15% of the height of a food fermentation container 5 in which the food and beverage fermentation device 1 is used. The height of the food fermentation container 5 may be measured from the top surface of the bottom of the food fermentation container 5 to the top of the rim 17.

The following steps may be followed in order to carry out the inventive method: (1) A food fermentation container 5 may be filled approximately eighty-five percent with the desired food or beverage contents 8 mixed with optional brine or whey recipe and completely covered by an optional thin layer of oil 7, by way of example, but not as a limitation, olive oil, which may be up to one-fourth inch deep but not touching any part of the food and beverage fermentation device 1 once the insertion device is properly placed onto the food fermentation container 5 in accordance with the inventive method. (2) The food and beverage fermentation device 1 may be placed into the food fermentation container 5 and the lip 2 of the food and beverage fermentation device may be seated onto the rim 17 of the opening or mouth of the food fermentation container 5 where it will situate and remain in place while the food fermentation container 5 is being closed and sealed with a prepped lid 9 and made airtight with a gasket or seal 6 as well as for the duration of the food or beverage fermentation process. The total length of time will be determined by the fermenter according to personal taste or health preferences. (3) Prior to enclosing the food or beverage contents 8 within the food fermentation container 5, the lid 9 may be prepped by installing a grommet 20 into a hole 16 in the lid 9. (4) Any variation airlock device 10 may be gently inserted into the grommet opening 14 until it protrudes beneath the lid roof 26. (5) The lid 9 with or without seal 6 may be attached onto the rim 17 of the opening or mouth of the food fermentation container 5.

The grommet 20 may have two collars 15, the collars 15 may oppose one another on the top and bottom of the grommet 20. The opposing collars 15 may both clasp snug around the hole 16 in the lid 9 when all measurements of the grommet 20, lid roof 26, and hole 16 width are corresponding. The thickness of the lid roof 26 must be no more than the grommet groove width 22 and the grommet groove diameter must be the same as the lid hole 16 width in order to maintain the airtight environment of the food fermentation container 5.

The airlock device 10 depicted is a 3-piece airlock. Such an airlock device 10 may be prepped before it may be situated in the food fermentation assembly 34. The 3-piece airlock cavity 27 may be filled halfway with water. The 3-piece airlock piston 23 may be placed inside the 3-piece airlock cavity 27 over the 3-piece airlock tube 13. The top of the 3-piece airlock 10 may be closed off with the 3-piece airlock vented cap 11, which may have holes 24 where oxygen released from the food or beverage fermentation process may be released from the airlock device 10. The 3-piece airlock device 10 may be inserted into the grommet opening 14 of the grommet 20 installed in the food fermentation container 5 lid 9 and may allow the oxygen released by probiotics of the fermenting food or beverage contents 8 to escape the food fermentation container 5 while prohibiting contaminants and oxygen from entering the food fermentation container 5.

As the food or beverage contents 8 undergo the fermentation process, oxygen released by the cultured probiotics during the food or beverage 8 fermentation process may bubble up out of the food or beverage contents 8 through the oil 8, which may serve as a barrier between the released oxygen exhaled by the cultured probiotics during the food or beverage 8 fermentation process and the food or beverage contents 8, while preventing growth of mold. The oxygen released by the cultured probiotics during the food or beverage contents 8 fermentation process may continue to rise up and into the at least one aperture 3 in the food and beverage fermentation device 1 and into an opening 28 at the bottom of an airlock tube 13. This oxygen released by the cultured probiotics during the food or beverage contents 8 fermentation process may pass through the airlock tube 13 up into the 3-piece airlock piston 23 of the 3-piece airlock, which may causes the 3-piece airlock piston 23 to rise until it is hindered by the 3-piece airlock vented cap 11, causing the filled 3-piece airlock piston 23 to release the oxygen released by the cultured probiotics during the food or beverage content 8 fermentation process. The oxygen released by the cultured probiotics during the food or beverage contents 8 fermentation process may finally be released through the holes 24 of the 3-piece airlock vented cap 11. At the conclusion of these steps, the food and beverage fermentation device 1 may keep the fermenting food or beverage contents 8 away from the exposed protruding 3-piece airlock tube 13 underneath the lid roof 26 as the food or beverage contents 8 shift or expand during the fermentation process, thus preventing possible stoppage of the 3-piece airlock tube 13.

Due to the device and method of the food and beverage fermentation device 1 facilitating consistent passage and release of oxygen released by the cultured probiotics during the food or beverage fermentation process through any variation airlock device 10, there is no possibility for the intake of oxygen or other foreign matter into the food fermentation container 5, which could cause food contamination or growth of mold and undesirable bacteria.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A food and beverage fermentation device comprising:
a hollow tapered body having a wide end and an opposing narrow end adapted to be received by a container;
a lip located along the wide end and adapted to rest upon a rim of the container;
a base extending across an inner region defined by a wall of the hollow tapered body;
at least one aperture extending through the wall; and
a retaining mechanism located along the narrow end and adapted to limit movement of a product carried by the container, wherein the retaining mechanism comprises a plurality of teeth.

2. The device according to claim 1 wherein the hollow tapered body is conical and the base connects to the wall along an entirety of a wall circumference defining the narrow end.

3. The device according to claim 1 wherein the lip has an outer diameter greater than an outer diameter of the wide end.

4. The device according to claim 1 wherein the lip is adapted to be secured between the rim and a lid secured to the container.

5. The device according to claim 4 wherein the lid comprises a grommet adapted to carry an airlock tube.

6. The device according to claim 5 wherein the airlock tube extends above the lid and is adapted to release oxygen released during a fermentation process within the container.

7. The device according to claim 1 wherein the at least one aperture comprises:
 a first ovular slit located proximate the wide end; and
 a second ovular slit opposing the first ovular slit.

8. The device according to claim 1 wherein the device has a height less than 15% of a height of the container.

9. A food and beverage fermentation device comprising:
 a hollow conical body having a wide end and an opposing narrow end adapted to be received by a container;
 a lid secured to the container, wherein the lid comprises a grommet adapted to carry an airlock tube;
 a lip located along the wide end and adapted to rest upon a rim of the container and to be secured between the rim and the lid;
 a base extending across an inner region defined by a wall of the conical tapered body and connecting to the wall along an entirety of a wall circumference defining the narrow end;
 a retaining mechanism located along the narrow end and adapted to limit movement of a product carried by the container; and
 at least one aperture extending through the wall.

10. The device according to claim 9 wherein the retaining mechanism comprises:
 a plurality of teeth located along the narrow end.

11. The device according to claim 9 wherein the device has a height less than 15% of a height of the container.

12. The device according to claim 9 wherein the lip has an outer diameter greater than an outer diameter of the wide end.

13. The device according to claim 9 wherein the airlock tube extends above the lid and is adapted to release oxygen released during a fermentation process within the container.

14. The device according to claim 9 wherein the at least one aperture comprises:
 a first ovular slit located proximate the wide end; and
 a second ovular slit opposing the first ovular slit.

15. A drink and food fermentation device comprising:
 a hollow conical body having a wide end and an opposing narrow end adapted to be received by a container;
 a lip located along the wide end, having an outer diameter greater than an outer diameter of the wide end, and adapted to rest upon a rim of the container;
 a base extending across an inner region defined by a wall of the conical tapered body and connecting to the wall along an entirety of a wall circumference defining the narrow end;
 a plurality of teeth located along the narrow end and adapted to limit movement of a product carried by the container; and
 a first ovular slit located proximate the wide end; and
 a second ovular slit opposing the first ovular slit; and
  wherein the device has a height less than 15% of a height of the container.

16. The device according to claim 15 wherein the lid has a grommet adapted to carry an airlock tube extending above the lid and adapted to release oxygen released during a fermentation process within the container; and
 wherein the lip is adapted to be secured between the rim and a lid secured to the container.

* * * * *